United States Patent
Huggar et al.

(10) Patent No.: US 12,028,389 B1
(45) Date of Patent: Jul. 2, 2024

(54) FOCAL AWARENESS SYSTEM FOR ONLINE COLLABORATION

(71) Applicant: United Services Automobile Association (USAA), San Antonio, TX (US)

(72) Inventors: Stacy Callaway Huggar, San Antonio, TX (US); Snehal Desai, Richardson, TX (US); Kristina Suniga-Cabrera, San Antonio, TX (US); Noe Alberto Martinez, San Antonio, TX (US); Katrina Marie Zell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 35 days.

(21) Appl. No.: 17/825,849

(22) Filed: May 26, 2022

Related U.S. Application Data

(60) Provisional application No. 63/193,638, filed on May 27, 2021.

(51) Int. Cl.
| | |
|---|---|
| *H04L 65/403* | (2022.01) |
| *G06F 3/01* | (2006.01) |
| *G06F 3/0484* | (2022.01) |
| *G06F 3/0489* | (2022.01) |
| *G06T 3/20* | (2006.01) |
| *G06V 40/20* | (2022.01) |

(52) U.S. Cl.
CPC ............ *H04L 65/403* (2013.01); *G06F 3/016* (2013.01); *G06F 3/0484* (2013.01); *G06F 3/0489* (2013.01); *G06T 3/20* (2013.01); *G06V 40/20* (2022.01); *G06T 2200/24* (2013.01)

(58) Field of Classification Search
CPC ....... H04L 65/403; G06V 40/20; G06F 3/016; G06F 3/0484; G06F 3/0489; G06T 3/20
See application file for complete search history.

(56) References Cited

U.S. PATENT DOCUMENTS

| | | | |
|---|---|---|---|
| 6,798,457 B2 * | 9/2004 | Boyden .................. | H04N 7/144 348/373 |
| 8,384,760 B2 * | 2/2013 | Tan ..................... | H04N 21/4223 348/14.01 |
| 8,754,927 B2 * | 6/2014 | Fritsch .................. | H04N 7/144 348/14.08 |

(Continued)

*Primary Examiner* — Olisa Anwah
(74) *Attorney, Agent, or Firm* — Fletcher Yoder, P.C.

(57) ABSTRACT

The present disclosure is related to a focal awareness system that includes processors and memory storing instructions. The instructions may cause the processors to generate a graphical user interface (GUI) configured to present an online meeting window on a display during an online meeting, identify a location of a camera with respect to the display, and position the online meeting window on the display based on the location of the camera. instructions may also cause the processors to identify a position of a video window within the online meeting window, identify a respective location of each camera of a matrix of cameras with respect to the position of the video window, determine a closest camera having a shortest distance with respect to the position of the video window based on the respective location of each camera of the matrix of cameras, and activate the closest camera.

5 Claims, 7 Drawing Sheets

(56) References Cited

U.S. PATENT DOCUMENTS

| | | | | |
|---|---|---|---|---|
| 8,908,008 B2* | 12/2014 | Tan | ........................ | H04N 7/144 |
| | | | | 348/14.07 |
| 9,325,939 B2* | 4/2016 | Schultz | .................. | G06V 40/18 |
| 9,330,589 B2* | 5/2016 | Cope | ........................ | G09G 3/20 |
| 2015/0270983 A1* | 9/2015 | Givental | .................. | H04N 7/15 |
| | | | | 382/103 |
| 2015/0373303 A1* | 12/2015 | Visosky | .................. | H04N 23/50 |
| | | | | 348/14.05 |
| 2017/0168585 A1* | 6/2017 | Faaborg | .................. | G06F 3/147 |
| 2022/0391230 A1* | 12/2022 | Sharma | .................. | G06F 9/542 |

\* cited by examiner

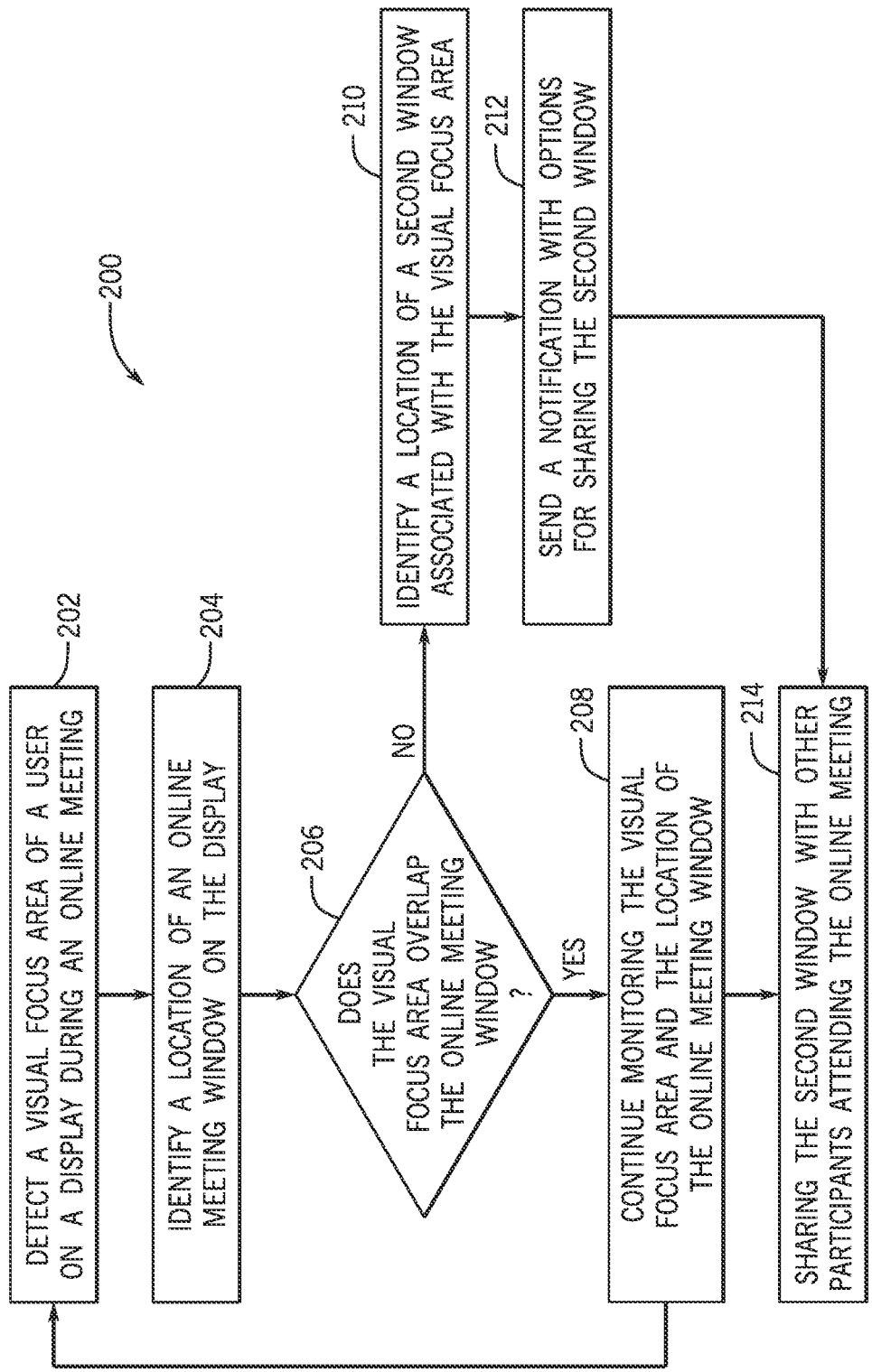

FOCAL AWARENESS SYSTEM FOR ONLINE COLLABORATION

CROSS-REFERENCE TO RELATED APPLICATION

The present application claims the benefit of and priority to U.S. Provisional Patent Application Ser. No. 63/193,638, titled "FOCAL AWARENESS SYSTEM FOR ONLINE COLLABORATION," which was filed on May 27, 2021, and which is herein incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Online collaborations have become more prevalent for organizations. The online collaborations allow individuals to accomplish a common goal more efficiently and collectively as compared to when the individuals work alone. For example, online meetings or video conferences may provide platforms for the individuals to share their knowledge and solutions to issues without physically gathering together, thus saving time and reducing costs for the organizations. The online meetings may allow users (e.g., online meeting participants) to use their individual computing devices equipped with cameras to join the online meetings from various remote locations. However, oftentimes during the online meetings, certain users (e.g., audience; listeners) may appear "zoned out" as their eyes may focus on their screens rather than their cameras. Such "zoned out" appearances may cause other users (e.g., speakers) to have an impression that the certain users are not looking directly at them and/or that their speech is not interesting to the certain users.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a focal awareness system may include one or more processors and memory storing instructions. The instructions, when executed by the one or more processors, may cause the one or more processors to generate a graphical user interface (GUI) configured to present an online meeting window on a display during an online meeting, identify a location of a camera with respect to the display, and position the online meeting window on the display based on the location of the camera.

In another embodiment, a focal awareness system may include one or more processors and memory storing instructions. The instructions, when executed by the one or more processors, may cause the one or more processors to identify a position of a video window within an online meeting window on a display, identify a respective location of each camera of a matrix of cameras with respect to the position of the video window, determine a closest camera having a shortest distance with respect to the position of the video window based on the respective location of each camera of the matrix of cameras, and activate the closest camera.

In yet another embodiment, a method of operating a focal awareness system includes using one or more processors to perform operations, including identifying a position of an online meeting window on a display during an online meeting, identifying a location of a camera with respect to the position of the online meeting window, and moving the online meeting window based on the location of the camera.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 7 illustrates a flow diagram of a process of using the focal point monitoring system to provide the user with the options of sharing the one or more windows with the other users as shown in FIG. 3, in accordance with embodiments described herein.

DETAILED DESCRIPTION

Figure 1:
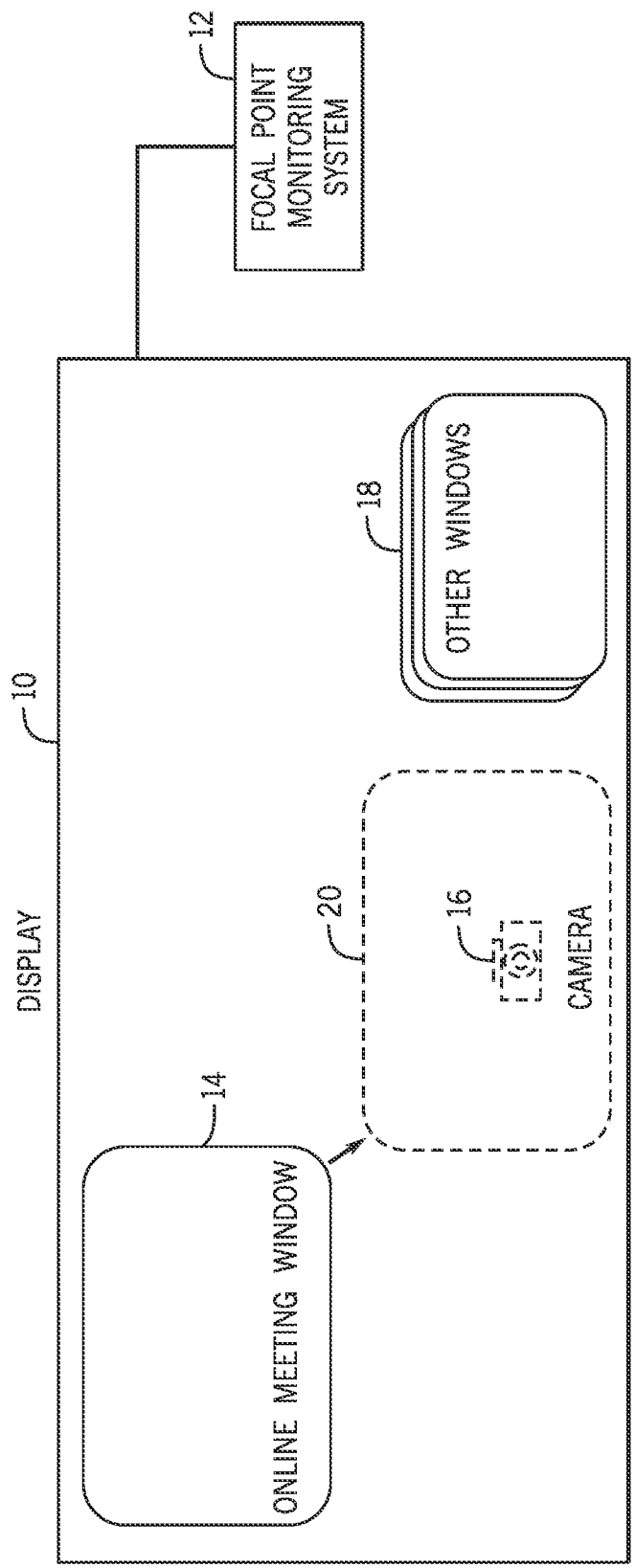
FIG. 1 illustrates a block diagram of a focal point monitoring system that is configured to provide dynamic positioning of an active working window on a display, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

Collaboration is an area of focus for organizations. By providing a framework in which individuals can work together toward a common goal, collaboration platforms allow individuals to accomplish more collectively than they would individually. Moving collaboration to the online world has become more prevalent as networks (e.g., the Internet) provide an efficient collaborative medium for individuals from different organizations (e.g., companies, schools, governments) and/or from different units (e.g., departments, sub-divisions, groups of one organization) and/or from different locations (e.g., geographic locations, buildings, rooms) to work together toward a common goal. Online collaborations (e.g., online meetings, video conferences) may allow the individuals to accomplish the common goal more efficiently with respect to time and/or costs.

In some embodiments, the online meetings may allow users to use their individual computing devices (e.g., desktop computers, laptops, tablets, smart phones) that are equipped with speakers, microphones, display screens, and/or cameras to join the online meetings remotely from different locations. During an online meeting via a collaboration platform, an online meeting window may be presented on respective display screens of the individual computing devices. In this way, the users may be able to view images (e.g., video obtained by the cameras) of one another on the display screens, and the users may be able to speak to one another (e.g., have a conversation) using the speakers and the microphones.

During the online meeting, one or more users (e.g., speakers) may speak (e.g., present), while also listening to and/or viewing responses from other users (e.g., listeners). However, the speakers may notice some listeners behaving in a distracting manner. For example, some listeners may appear to look at other parts of their screens (e.g., other than the online meeting window and/or away from the camera). The speakers may lose focus and/or struggle to maintain the discussion as the speakers may think that the distracting behaviors indicate that some listeners are not interested in the discussion. Such loss of focus may inhibit effectiveness of the online collaborations.

In some cases, the online meeting users appearing "zoned out" may be caused by the locations of the cameras relative to the display screens. For example, a camera may be installed at the bottom center of the display screen such that when the users are actually looking at the online meeting window that is positioned in the upper center of the display screen, they appear to not be looking into the camera. In some cases, the online meeting users appearing "zoned out" may be caused by the users viewing additional windows that are relevant to the discussion. For example, the additional windows may contain supporting materials (e.g., documents, figures, presentations) related to the discussion that may help the users better understand the discussion.

Embodiments of the present disclosure are generally directed toward a focal awareness system that includes a focal point monitoring system that identifies where a camera is positioned with respect to a display screen and adjusts a working window (e.g., a current window of focus or activity, such as scrolling or typing) based upon the camera location during an online meeting. For example, if the camera is at the bottom center of the display screen, a quick key may be used to position (e.g., reposition) the working window in a position of a graphic user interface (GUI) closest to (or closer to) the camera. In this manner, the eyes of the user may focus more closely to the camera as the user views the working window. In some embodiments, a matrix of cameras may be positioned behind the display screen, and eye tracking techniques be used to track eyes of the user (e.g., to monitor eye location and/or gaze directions) to determine a region of focus on the display screen. Depending on the eye location and/or the gaze direction, a particular camera of the matrix may be activated to give the other users' a view that generally includes appearance of the user looking at them through the camera, which may make conversations more engaging.

In addition, the focal point monitoring system may use additional techniques to increase the users' focus in the online meeting. For example, an indication that a participant is actively focusing on another window rather than the online meeting window may be provided. The indication may be an opt-in feature similar to screen sharing that allows other users to see at least a contextual indicator of what the participant is focusing on during the online meeting (e.g., contents viewed by the participant, such as the listener).

Additional details with regard to the focal point monitoring system, including monitoring users' visual focus area on a display screen, dynamically adjusting positions of an online meeting window, and/or dynamically activating cameras of a camera matrix, prompting the users to share their current window of focus, will be discussed in detail herein with reference to FIGS. 1-7.

With the forgoing in mind, turning now to the figures, FIG. 1 illustrates a block diagram of an embodiment of a focal awareness system that includes a focal point monitoring system 12 that provides dynamic positioning of an active working window (e.g., a current window of focus or activity, such as scrolling or typing) on a display 10 (e.g., display screen). The display 10 may be a screen of a computing device, such as a desktop computer, a laptop computer, a tablet, a smart phone, a monitor, and so on. The display 10 may include or present an online meeting window 14, which may be an active working window at least during certain times of an online meeting. The display 10 may also include a camera 16 that may capture an image (e.g., video stream) of the user of the computing device. The camera 16 may be located inside or behind the display 10 (e.g., at a bottom center, as illustrated) or outside the display 10 (e.g., on periphery of the display 10; at a bezel that forms a frame around at least a portion of the display 10; fastened/clipped onto and/or positioned adjacent to the display 10). For example, the camera 16 may be a webcam built into the computing device or a separate camera communicatively connected to the display 10.

In some embodiments, the display 10 may further include other windows 18. For example, during the online meeting, a user may open the other windows 18 to view certain visual content, such as files, videos, photos, diagrams, presentation slides, or websites that may be relevant to a topic of discussion during the online meeting. Such visual content may help the user better understand the topic. In some embodiments, the visual content may be irrelevant to the topic of the online meeting. For example, the user may use the other windows 18 to check emails, monitor certain jobs, chat with people not participating the online meeting, and the like. In some embodiments, the focal point monitoring system 12 may be configured to determine whether the visual content in the other windows 18 is relevant to the online meeting or irrelevant to the online meeting (e.g., based on keywords in the other windows 18; a website address associated with the other windows 18; how the visual content was received by the user, such as relevant if from a link or attachment from another participant in the online meeting/chat in the online meeting and irrelevant if from someone who is not a participant in the online meeting; and/or approval of the visual content via input by the speaker or other user). Then, the focal monitoring system 12 may take different steps if the other windows 18 is relevant to the online meeting as compared to if the other windows 18 is irrelevant to the online meeting.

The display 10 may be communicatively connected to the focal point monitoring system 12. As described previously, the focal point monitoring system 12 may identify where the camera 16 is located with respect to the display 10 (e.g., based on receipt of an identifier associated with the display 10, such as a model number of the computing device that has the display 10; based on input by the user; based on respective positions of the display 10 and the camera 16, which may be received via respective position sensors; based on image analysis techniques and/or calibration processes carried out prior to and/or at a start of the online meeting, such as analyzing the images to determine whether the camera 16 is oriented up or down and/or prompting the user to look at the display 10 and then the camera 16 to capture calibration data) and position (e.g., reposition) the online meeting window 14 based upon the camera location. For instance, if the camera 16 is at the bottom center, the online meeting window 14 may initially open in a position 20 (e.g., region) of a graphic user interface (GUI) closest to the camera 16 (or closer to; in a vicinity of; over or around; a shortest distance between a portion of the online meeting window 14, such as a center or an edge or a corner, and the camera 16). In some embodiments, the online meeting window 14 may initially open in another position of the GUI away from the camera 16, such as a top corner of the display 10, as shown in FIG. 1. Then, in response to actuation of a quick key (e.g., physical or virtual button) by the user, the online meeting window 14 may be adjusted to the position 20 of the GUI, as shown in FIG. 1. In this manner, the eyes of the user may focus more closely to the camera 16 as the user looks at the online meeting window 14, therefore giving a more favorable appearance as the user will appear to be looking into the camera 16 (or near the camera 16) in the images of the user viewed by the other users participating the online meeting. In some embodiments, the online meeting window 14 may be automatically positioned in the position 20 via the focal point monitoring system 12 (e.g., without actuation of the quick key; initially open and/or move in response to determination of the position of the camera 16).

It should be appreciated that the focal point monitoring system 12 may position (or reposition) the other windows 18 to the position 20 in response to the other windows 18 being the active working window. For example, while the user is engaged with the online meeting window 14 and/or is not interacting with any of the other windows 18, the online meeting window 14 may be in the position 20 and the other windows 18 may be outside of the position 20, as shown. However, upon clicking on a first one of the other windows 18 and/or after a series of actions within a period of time (e.g., more than one click over 5 or 10 seconds), the first one of the other windows 18 may be adjusted to the position 20 (e.g., automatically in response to the clicking and/or the actions). This may also be done upon focusing on the first one of the other windows 18 (e.g., as determined by eye tracking software; for more than a period of time, such as more than 5 or 10 seconds). For example, upon focusing on the first one of the other windows 18, the first one of the other windows 18 may be adjusted to the position 20 (e.g., automatically in response) to the focusing. In some embodiments, the clicking, the series of actions, and/or the focusing may result in a prompt to the user, such as a prompt (e.g., via presenting or highlighting the quick key) to the user to select the quick key to move the first one of the other windows 18. In this way, the user will appear to be looking in the direction of the camera 16 even as the user views other visual content in the other windows 18.

In some embodiments, the focal point monitoring system 12 will only move the other windows 18 that are determined to be relevant to the online meeting (and not the other windows 18 that are determined to be irrelevant to the online meeting). This may enable the other users to better gauge whether the user is paying attention to the discussion or is distracted by unrelated visual content and/or may discourage the user from viewing the unrelated visual content during the online meeting. In some embodiments, the online meeting window 14 may move (e.g., down, up, or to the side) to remain visible with the first one of the other windows 18 at the position 20. However, the online meeting window 14 may instead by covered by (e.g., not visible with) the first one of the other windows 18 at the position 20.

As mentioned above, in some embodiments, the camera 16 may be located inside or behind the display 10. In such embodiments, the online meeting window 14 may be positioned over the camera 16 (e.g., to surround the camera 16). For example, evolved technologies have made it feasible to put a camera behind a monitor (e.g., a monitor having a LED panel). A single pixel of the LED panel may be modified allowing a pinhole camera to peer through it. Considering pixel-densities on high-resolution monitors, the user may not notice an existence of the single pixel that is disabled as a display pixel. Or, even if the user may notice the camera 16, the location of the camera 16 may still be preferable for online meetings for the various reasons disclosed herein, for example. In some embodiments, the camera 16 may be outside the display 10. In such embodiments, the online meeting window 14 may be positioned close to the camera 16.

While the focal point monitoring system 12 is shown as being separate from the display 10, it should be noted that the focal point monitoring system 12 may be integrated into the display 10 or a computing device communicatively connected to the display 10. In some embodiments, some components (e.g., an infrared camera) of the focal point monitoring system 12 may be integrated into the display 10, while other components may be separated from the display 10. In some embodiments, certain functions, such as notifications, reminders, alerts, and/or warnings generated by the focal point monitoring system 12 may be presented to online meeting users via the display 10.

As mentioned above, some embodiments may include a matrix of cameras behind the display 10 (and/or around a periphery of the display 10) and a software application for eye tracking (e.g., detecting eye locations and/or gaze directions) for online meeting users. Depending on the eye locations and/or the gaze directions, a particular camera of the matrix of cameras may be activated to give the other users' a view of the user looking into the camera, which may make conversations more engaging.

Figure 2:
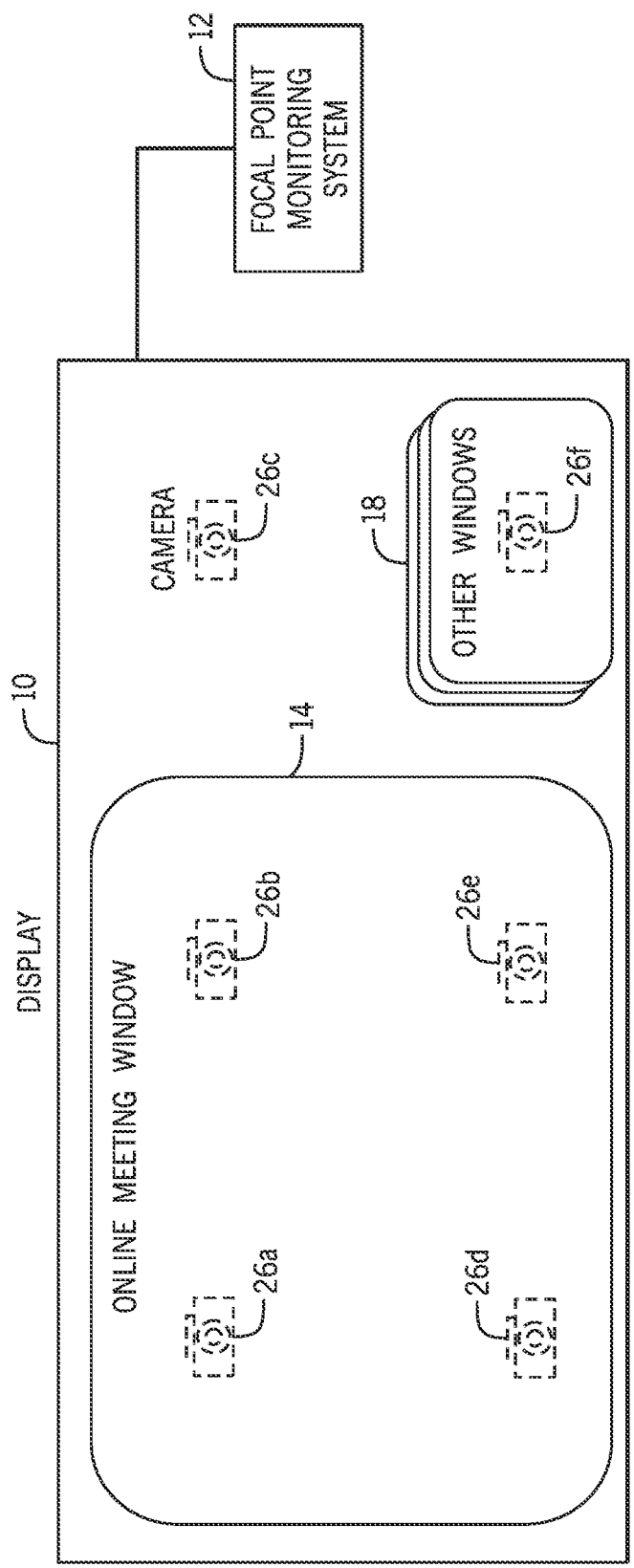
FIG. 2 illustrates a block diagram of the focal point monitoring system of FIG. 1 that is configured to selectively activate a camera of a camera matrix, in accordance with embodiments described herein.

With the foregoing in mind, FIG. 2 illustrates a block diagram of the focal point monitoring system 12 with selective activation of a camera of a camera matrix 26 on the display 10. The camera matrix 26 may be constructed using similar technology described herein (e.g., multiple pixels of an LED panel may be modified allowing multiple pinhole cameras to peer through them) or any other suitable technologies that can put a camera matrix behind the display 10 to allow multiple cameras to see through the display 10.

The camera matrix 26 may include multiple cameras, such as cameras 26a, 26b, 26c, 26d, 26e, and 26f, distributed across the display 10. Using the camera matrix 26 may provide certain advantages in comparison to using a single camera (e.g., the camera 16). For example, it may be beneficial for the online meeting window 14 to be relatively large when several users are participating in the online meeting. The online meeting window 14 may include multiple video windows corresponding to each participant. When one participant is giving a speech, other participants may switch their focal points to the participant giving the speech. While the online meeting window 14 or the video window of the participant giving the speech may be moved to be over or closer to the camera in the manner described herein (e.g., FIG. 1), moving the online meeting window 14 or the video window of the participant closer to a single camera of the camera matrix 26 may not be convenient and/or may be distracting in certain circumstances. However, using the camera matrix 26 allows activating a particular camera (e.g., the camera 26b), such as one that is positioned most closely to a video window corresponding to a participant giving the speech during the online meeting at the moment. In some embodiments, the focal point monitoring system 12 may activate the particular camera that is positioned closest to the participant giving the speech and may activate different cameras in this way as different users speak during the online meeting. In some embodiments, each camera in the camera matrix 26 may correspond to and/or be assigned to one or more participants. For example, a first image of a first participant may be positioned at (e.g., centered about) the camera 26a, a second image of a second participant may be positioned at (e.g., centered about) the camera 26b, and so on. Thus, when the first participant is speaking, the camera 26a is activated (e.g., automatically activated; in response to detection of sounds/speech from the first participant, or sounds/speech that lasts for more than a period of time, such as more than 2 or 3 seconds; based on inputs that the first participant is speaking or is designated to speak). Then, when the second participant is speaking, the camera 26b is activated, and so on.

Although in the present embodiment the cameras 26a, 26b, 26c, 26d, 26e, and 26f are arranged uniformly over the display 10, it should be noted that, in some embodiments, the cameras of the camera matrix may be arranged non-uniformly. In some embodiments, some of the cameras may be arranged uniformly over certain areas of the display 10, while the others may be arranged non-uniformly over other areas of the display 10.

Activating a particular camera of the camera matrix 26 may depend on monitoring, via the focal point monitoring system 12, a visual focus area of the user on the display 10, which may be determined via the eye tracking system based on eye location, gaze direction, point of gaze, or any area of visual information that may be related to where the eyes of the user focus on the display 10. In some embodiments, the focal point monitoring system 12 may activate the particular camera that is closest to the visual focus area of the user and/or the active working window on the display 10. The focal point monitoring system 12 may activate the particular camera that is closest to the visual focus area of the user in response to the user focusing in the visual focus area for more than a period of time, such as 2, 3, 4, 5, or 10 seconds. The focal point monitoring system 12 may activate the particular camera that is closest to the active working window in response to the user clicking in the active working window and/or after a series of actions within a period of time (e.g., more than one click over 5 or 10 seconds).

In some embodiments, the focal point monitoring system 12 only activate the particular camera that is closest to the visual focus area of the user if the visual focus area includes the online meeting window or one of the other windows 18 that is determined to be relevant to the online meeting. In some embodiments, the focal point monitoring system 12 may not provide may not activate the particular camera that is closest to the visual focus area of the user if the visual focus area does not include any windows (e.g., the online meeting window or other windows 18) that are relevant to the online meeting. This may enable the other users to better gauge whether the user is paying attention to the discussion or is distracted by unrelated visual content and/or may discourage the user from viewing the unrelated visual content during the online meeting.

A variety of eye tracking technologies may be used to monitor the visual focus area. Eye tracking may refer to a process of measuring where the user looks, also known as point of gaze or gaze direction. The measurements may be conducted by the eye tracking system, which may utilize the cameras of the camera matrix 26 and/or other imaging sensors (e.g., other cameras) to record positions and movements of the eyes of the user.

For example, the eye tracking system may use optical tracking of corneal reflections or pupil center corneal reflection (PCCR). Near-infrared light (e.g., light having wavelengths between 800 and 2500 nm) is directed toward the pupil (the center of the eyes), causing detectable reflections in both the pupil and the cornea (the outer-most optical element of the eyes). Such reflections represented by vectors between the cornea and the pupil may be tracked by an infrared camera (e.g., one of the cameras in the camera matrix 26 or other imaging sensor). Using the infrared camera may allow for a differentiation between the pupil and the iris, as the light from visible spectrum (e.g., wavelengths between 380 and 700 nm) is likely to generate uncontrolled specular reflection. Another advantage of using the infrared camera is that the infrared light is not visible to human eyes, thus causing less distraction while the eyes are being tracked. In some embodiments, the position of the pupil reflection is tracked with respect to the position of the corneal reflection. The relative distance between two positions may allow calculations of the gaze direction using certain eye tracking software.

As described previously, during an online meeting, a participant may be actively focusing on other windows 18 rather than the online meeting window 14. The focal point monitoring system 12 may use additional techniques to increase the user's and/or other users' focus in the online meeting. For example, upon determining that the user is focusing on one of the other windows 18, the focal point monitoring system 12 may provide an indication or notification to prompt the user to share one of the other windows 18 to allow other participants to see the one of the other windows 18. In some embodiments, the focal point monitoring system 12 will only provide the prompt and/or only allow the sharing of the one of the other windows 18 if the one of the other windows 18 is determined to be relevant to the online meeting. In some embodiments, the focal point monitoring system 12 may not provide the prompt and/or may block sharing the one of the other windows 18 if it is determined to be irrelevant to the online meeting.

Figure 3:
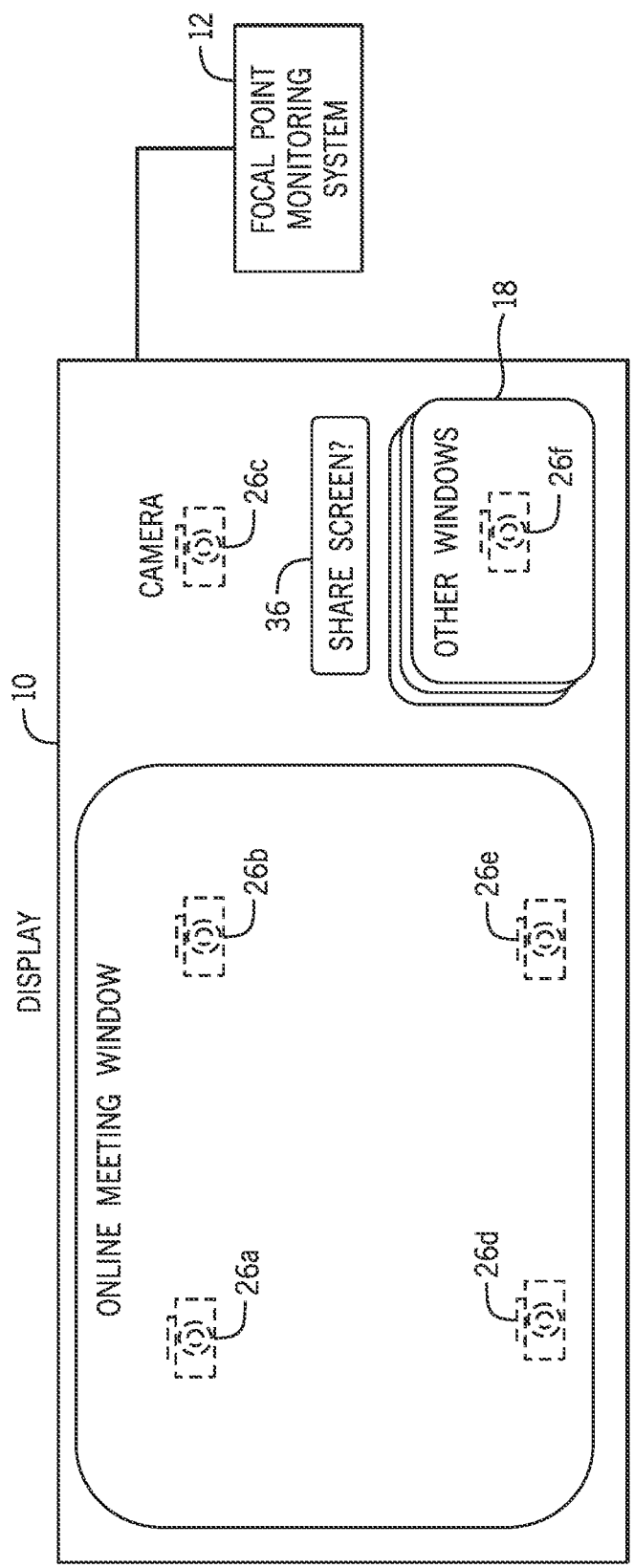
FIG. 3 illustrates a block diagram of the focal point monitoring system of FIG. 1 that is configured to provide a user with options of sharing one or more windows with other users, in accordance with embodiments described herein.

FIG. 3 illustrates a block diagram of the focal point monitoring system 12 with a prompt to a user to encourage sharing one or more windows with other users during an online meeting. By monitoring the user's visual focus area on the display 10, the focal point monitoring system 12 may identify whether the user's point of gaze is actively on one or more windows of the other windows 18. The one or more windows may include documents, videos, pictures, diagrams, presentation slides, and/or websites relevant to a topic of the online meeting. For example, the contents of the one or more windows may help the user better understand the topic of the online meeting.

In some embodiments, the focal point monitoring system 12 may identify whether the user's point of gaze is actively on the other windows 18 by detecting that the eyes of the user are focusing on the other windows 18 for a period of time (e.g., threshold time, such as 2, 3, 4, 5, 10, 30, or 60 seconds). The focal point monitoring system 12 may provide an indication that the user's eyes are focusing on the other windows 18 rather than the online meeting window 14. The indication may be in the form of a visual and/or audible notification, a reminder, an alert, a warning, or the like. As mentioned previously, the indication generated by the focal point monitoring system 12 may be presented to the user via the display 10 and/or to at least one of the other online meeting users via their respective display(s). In some embodiments, the indication may prompt the user to decide whether to share the one or more windows with the other users. For example, a popup window 36 may be provided in response to the user focusing on the other windows 18, and the popup window 36 may ask if the user want to share the other windows 18 during the online meeting. In some embodiments, the popup window 36 may include a share screen button for the user to click. In some embodiments, the popup window 36 may include different forms of the indication (e.g., a notification, reminder, alert, or warning). In some embodiments, the popup window 36 may only be provided if the focal point monitoring system 12 determines that the other windows 18 are relevant to the online meeting. Or the popup window 36 may prompt the user to share the screen if the other windows 18 are relevant (e.g., with text "Share Screen?"), but may prompt the user to close the other windows 18 if irrelevant (e.g., with text "Close Window"). It should be appreciated that the at least one of the other online meeting users may be able to view and/or share the other windows 18 being viewed by the user. For example, a moderator or host of the online meeting may be able to carry out these steps, although the user may initially grant permission for this to occur during a registration process and/or at a beginning of the online meeting, for example.

In some cases, the user may not want to share the full contents of the other windows 18 with other users (e.g., for security or privacy reasons). However, the indication may allow other users to see at least a contextual indicator of what the user is focusing on during the online meeting. For example, the indication presented to the other online meeting users via their respective displays may include information that indicates that the user is viewing the other windows 18 that are relevant to the online meeting. In this way, the other users may be informed that the user is still paying attention and interested, even if the user appears to be reading and/or scrolling through the other windows 18.

Figure 4:
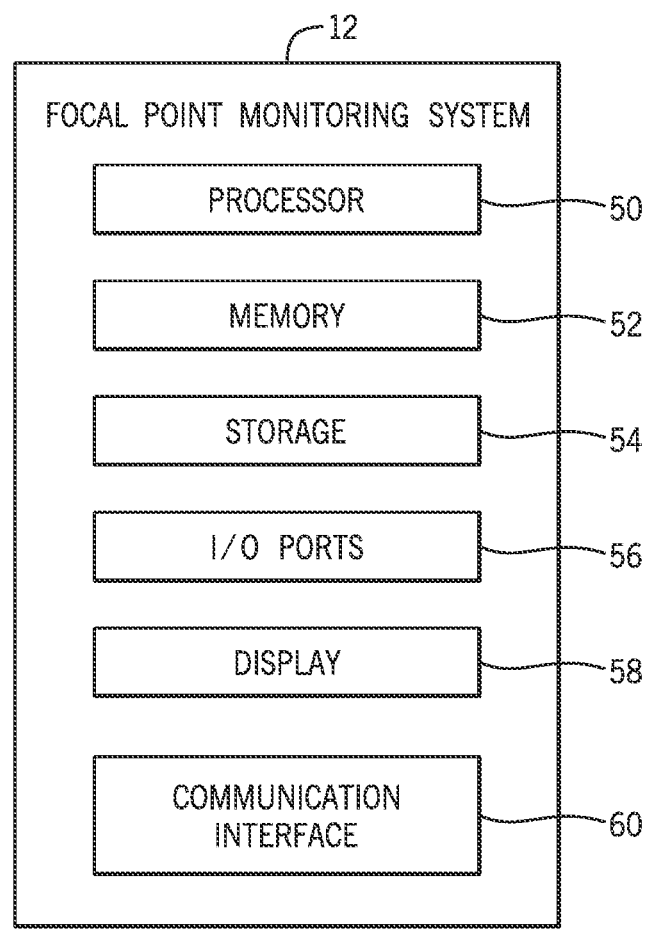
FIG. 4 illustrates a block diagram of components of the focal point monitoring system of FIG. 1, in accordance with embodiments described herein.

FIG. 4 is a block diagram of an embodiment of the focal point monitoring system 12. As shown in the example of FIG. 4, the focal point monitoring system 12 may include a processor 50, a memory 52, a storage 54, input/output (I/O) ports 56, a display 58, a communication interface 60, and other suitable components that may be related to online meeting techniques, camera location detection, focal point monitoring, and/or eye tracking.

The focal point monitoring system 12 may receive, via the communication interface 60, measurement data of a user participating an online meeting. The measurement data may be analyzed by a data analysis application. The data analysis application may be executed by the processor 50 and may be stored on the memory 52 and/or the storage 54. The processor 50 may generate an indication (e.g., a notification, a reminder, an alert, or a warning) to the user based on the analyzed data. The communication interface 60 may provide the indication to the display 10 and/or the display 58.

The focal point monitoring system 12 may be any suitable type of computing device but is not limited to: a desktop computer, a laptop computer, a notebook computer, a distributed computing device (e.g., a cloud computing device), a microcomputer, a system on a chip (SoC), a system in a package (SiP), and so forth. Although examples herein may describe the focal point monitoring system 12 as a physical system, implementations are not so limited. In some examples, the focal point monitoring system 12 may include one or more of a virtual computing environment, a hypervisor, an emulation, or a virtual machine executing on one or more physical computing devices. In some embodiments, the focal point monitoring system 12 or certain components (e.g., an infrared camera) of the focal point monitoring system 12 may be integrated into the display 10 or a computing device communicatively connected to the display 10.

The measurement data may include data measured by various sensors and cameras, including but not limited to locations of active windows on the display 10 (e.g., the online meeting window 14, the other windows 18), locations of cameras (e.g., the camera 16, cameras of the camera matrix 26, the infrared camera), gaze direction, point of gaze, and/or area of visual attention that may be related to where a user's eyes are focused on the display 10. In some embodiments, the focal point monitoring system 12 may receive, via the communication interface 60, user feedback, such as whether the user wants to share one or more windows during the online meeting.

Measurement data analysis applications may be executed by the processor 50 and may be stored on the memory 52 and/or the storage 54. For example, the measurement data analysis applications may include determining where the online meeting window 14 will be moved closer to the camera 16, determining which camera of the camera matrix 26 will be activated, calculating the gaze direction based on a relative distance between the position of the pupil reflection and the position of the corneal reflection detected by the infrared camera, differentiating reflections between the pupil and the iris, and so on.

The processor 50 may be configured to process instructions for execution within the focal point monitoring system 12. The processor 50 may include single-threaded processor(s), multi-threaded processor(s), or both. The processor 50 may be configured to process instructions stored in the memory 22. The processor 50 may include hardware-based processor(s) each including one or more cores. The processor 50 may include general purpose processor(s), special purpose processor(s), or both. The processor 50 may be communicatively coupled to other internal components (e.g., the I/O ports 56, the communication interface 60). Based on the measurement data, the processor 50 may identify the point of gaze of the user.

The memory 52 and the storage 54 may be any suitable articles of manufacture that can serve as media to store processor-executable code, data, or the like. These articles of manufacture may represent computer-readable media (e.g., any suitable form of memory or storage) that may store the processor-executable code used by the processor 50 to perform the presently disclosed techniques. The memory 52 and the storage 54 may also be used to store data described (e.g., the measurement data), various other software applications for analyzing the data, and the like. The memory 52 and the storage 54 may represent non-transitory computer-readable media (e.g., any suitable form of memory or storage) that may store the processor-executable code used by the processor 50 to perform various techniques described herein. It should be noted that non-transitory merely indicates that the media is tangible and not a signal.

The I/O ports 56 may be interfaces that may couple to other peripheral components such as input devices (e.g., a keyboard, a mouse), sensors, input/output (I/O) modules, and the like. The display 58 may operate to depict visualizations associated with software or executable code being processed by the processor 50. In an embodiment, the display 58 may be a touch display capable of receiving inputs from a user. The display 58 may be any suitable type of display, such as a liquid crystal display (LCD), plasma display, or an organic light emitting diode (OLED) display.

In general, the focal point monitoring system 12 may capture a variety of the measurement data associated with a user participating an online meeting using the communication interface 60. The communication interface 60 may be any suitable type of electronic circuitry designed to a specific standard that may enable the focal point monitoring system 12 to communicate with other computing devices (e.g., computers, tablets, or mobile phones). The communications may use various communication protocols, including but not limited to Open Database Connectivity (ODBC), TCP/IP Protocol, Distributed Relational Database Architecture (DRDA) protocol, Database Change Protocol (DCP), HTTP protocol, other suitable current or future protocols, or combinations thereof. Additionally, the focal point monitoring system 12 may include other relevant components (e.g., a network controller, a power supply, or a battery). It should be noted that the components described above with regard to the focal point monitoring system 12 are exemplary components and the focal point monitoring system 12 may include additional or fewer components as shown.

Figure 5:
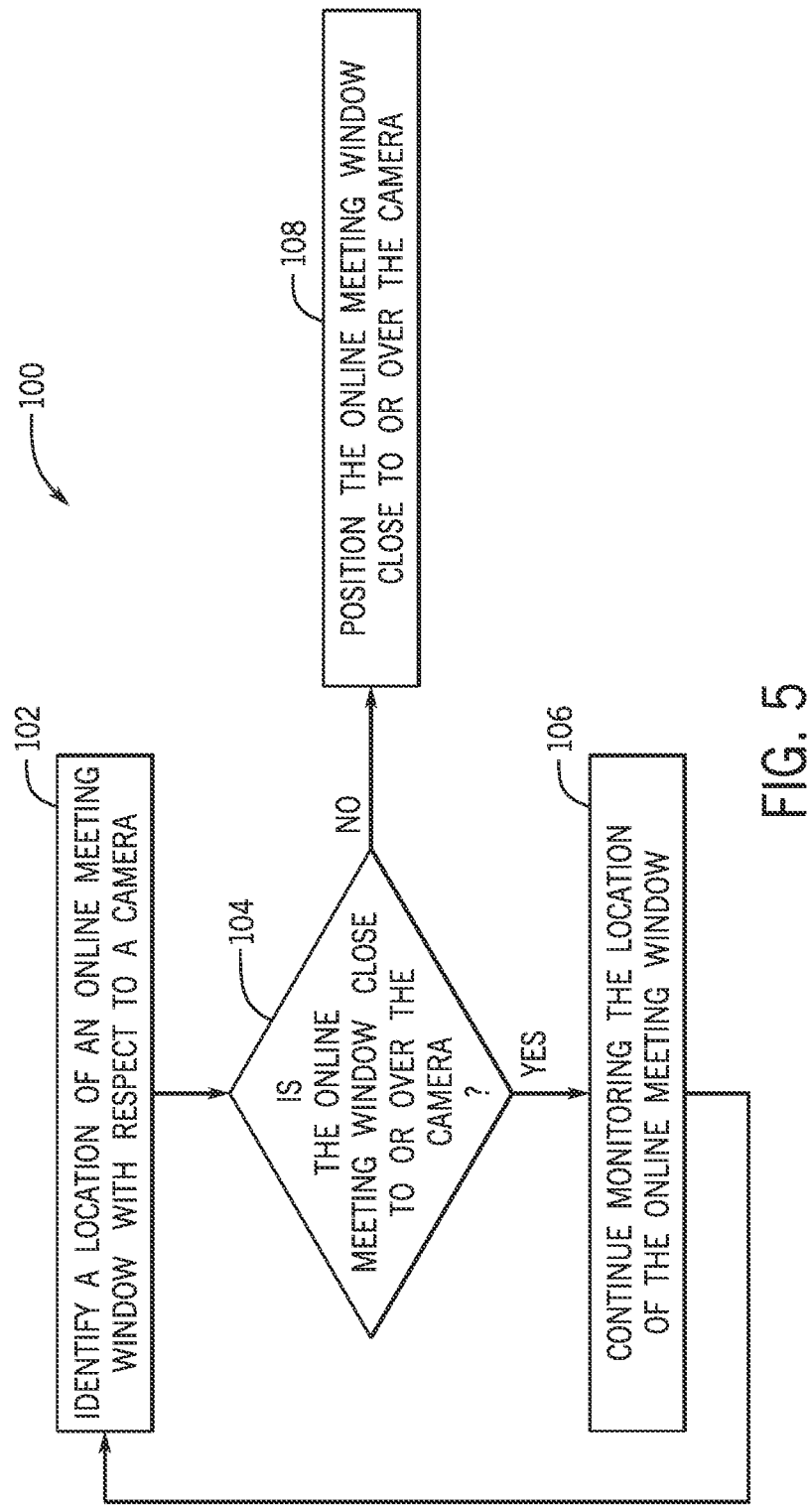
FIG. 5 illustrates a flow diagram of a process of using the focal point monitoring system to provide the dynamic positioning of the active working window on the display as shown in FIG. 1, in accordance with embodiments described herein.
Figure 6:
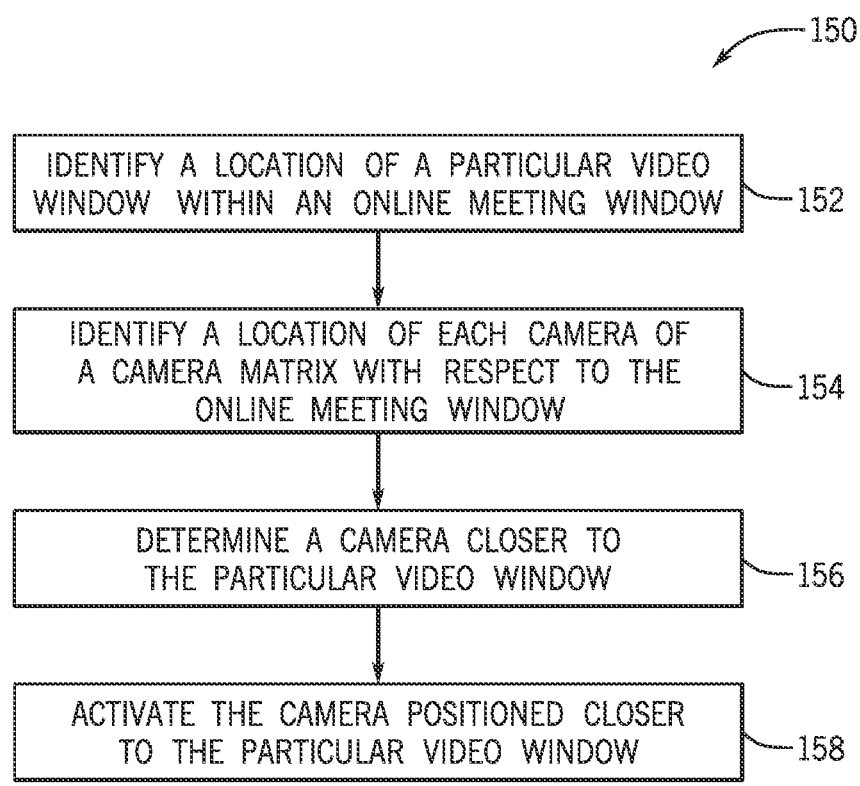
FIG. 6 illustrates a flow diagram of a process of using the focal point monitoring system to provide selective activation of the camera of the camera matrix as shown in FIG. 2, in accordance with embodiments described herein.

With the foregoing in mind, FIGS. 5-7 illustrate various processes corresponding to embodiments described in FIGS. 1-3. For example, FIG. 5 illustrates a flow diagram of a process 100 of using the focal point monitoring system 12 to provide the dynamic position of the active working window on the display 10, as shown in FIG. 1. At process block 102, the focal point monitoring system 12 may identify a location of an online meeting window (e.g., the online meeting window 14) with respect to a camera (e.g., the camera 16). For example, the focal point monitoring system 12 may detect where the camera and the online meeting window are positioned with respect to a display (e.g., the display 10). Based on the detected locations, the focal point monitoring system 12 may identify the location of the online meeting window with respect to the camera.

At process block 104, the focal point monitoring system 12 may determine if the online meeting window is close to (e.g., closest available or possible position; within a threshold distance, which may be calculated based on characteristics of the display and a size of the online meeting window) or over (e.g., overlapping; centered about) the camera. If so, the focal point monitoring system 12 may continue monitoring the location of the online meeting window at process block 106 to identify the location of the online meeting window with respect to the camera.

If, at process block 104, the focal point monitoring system 12 determines the online meeting window is not close to or over the camera, the focal point monitoring system 12 may adjust (e.g., move relative to the display and the camera) the online meeting window to position the online meeting window close to or over the camera at process block 108 so that the user's eyes may focus on the display more closely to the camera. In some embodiments, a quick key may be used to position the online meeting window in a position of a graphic user interface (GUI) closest to or over the camera.

Although the method described in FIG. 5 is described in a particular order, it should be noted that the method may be performed in any suitable order and is not limited to the order presented herein. It should also be noted that although each processing block is described in the method as being performed by the focal point monitoring system 12, other suitable computing systems may perform the methods described herein.

FIG. 6 illustrates a flow diagram of a process 150 of using the focal point monitoring system 12 to provide selective activation of a camera of a camera matrix, as shown in FIG. 2. At process block 152, the focal point monitoring system 12 may identify a location of a particular video window within an online meeting window. For example, the online meeting window may include multiple video windows that each corresponds to a respective participant attending the online meeting. The focal point monitoring system 12 may receive (e.g., via the communication interface 60) measurement data associated with the location of the particular video window on the display from certain sensors (e.g., position sensors) and/or other information from the computing system associated with the display. Then, the focal point monitoring system 12 may identify the location of the particular video window on the display.

At process block 154, the focal point monitoring system 12 may identify a location of each camera (e.g., the cameras 26a-26f) of a camera matrix (e.g., the camera matrix 26) with respect to the online meeting window. For example, the camera matrix may be constructed using multiple modified pixels of an LED panel allowing multiple cameras to see through the LED panel. The focal point monitoring system 12 may receive (e.g., via the communication interface 60) the location of each camera based on the pixel locations on the LED panel.

At process block 156, based on the identified location of the particular video window and the location of each camera of the camera matrix, the focal point monitoring system 12 may determine a camera closer to (or closest to) the particular video window. Then, at process block 158, the focal point monitoring system 12 may activate the determined camera that is positioned closer to (or closest to) to the particular video window.

Although the method described in FIG. 6 is described in a particular order, it should be noted that the method may be performed in any suitable order and is not limited to the order presented herein. It should also be noted that although each processing block is described in the method as being performed by the focal point monitoring system 12, other suitable computing systems may perform the methods described herein.

FIG. 7 illustrates a flow diagram of a process 200 to provide the user with options of sharing one or more windows with other users, as shown in FIG. 3. At process block 202, the focal point monitoring system 12 may detect a visual focus area of a user on a display (e.g., the display 10) during the online meeting. The display may include or be coupled to the camera, and/or the display may include the LED panel containing the camera matrix described herein. In some embodiments, the camera and/or the camera matrix may include an infrared camera that may measure a relative distance between the position of the pupil reflection and the position of the corneal reflection. The focal point monitoring system 12 may calculate (e.g., using the processor 50) the gaze direction using certain eye tracking software (e.g., stored in the memory 52 and/or the storage 54). Based on the calculated gaze direction, the focal point monitoring system 12 may detect the visual focus area of the user on the display during the online meeting.

At process block 204, the focal point monitoring system 12 may identify a location of an online meeting window on the display. The focal point monitoring system 12 may receive (e.g., via the communication interface 60) measurement data associated with the location of the online meeting window on the display from certain sensors (e.g., position sensors) and/or other information from the computing system associated with the display. At process block 206, the focal point monitoring system 12 may determine if the visual focus area overlaps the online meeting window. For example, if the visual focus area overlaps the online meeting window or is otherwise appropriately aligned, the focal point monitoring system 12 may continue monitoring the visual focus area of the user and the location of the online meeting window at process block 208. However, if the visual focus area does not overlap the online meeting window or is otherwise misaligned, the focal point monitoring system 12 may identify a location of a second window associated with the visual focus area at process block 210. For example, the second window may contain supporting materials (e.g., documents, figures, presentations) related to a topic of the online meeting that may help the user better understand the topic.

At process block 212, the focal point monitoring system 12 may send a notification with options for sharing the second window. For example, the notification may be presented to the user via a display (e.g., the display 10 or the display 58). In some embodiments, the notification may be presented in a popup window (e.g., the popup window 36). The notification may be provided to ask if the user want to share the second window during the online meeting. In some embodiments, the notification may be accompanied with an audible or haptic alert.

In response to a user's agreement to share the second window, the focal point monitoring system 12 may share the second window with at least one other participant (e.g., the speaker; the host) attending the online meeting at process block 214. In some embodiments, the user may not want to share the full contents of the second window with the other users. As such, the focal point monitoring system 12 may allow at least one of the other users to see at least a contextual indicator of the second window.

Although the method described in FIG. 7 is described in a particular order, it should be noted that the method may be performed in any suitable order and is not limited to the order presented herein. It should also be noted that although each processing block is described in the method as being performed by the focal point monitoring system 12, other suitable computing systems may perform the methods described herein.

It should be appreciated that the techniques disclosed herein may be combined in any suitable manner. For example, with reference to FIG. 7, after identifying the location of the second window associated with the visual focus area, the focal point monitoring system 12 may send the notification at the process block 212 of FIG. 7 and may also move the second window closer to a camera as set forth at process block 108 of FIG. 5 and/or activate a camera in a matrix of cameras as set forth at process block 158 of FIG. 6. Other features may be incorporated into the focal point monitoring system 12. For example, certain noise cancellation, audio drivers, operating system (OS) functions may be used to mute certain distractive sounds (e.g., new emails, background noise) during an online meeting. Such features also increase users' focus during the online meeting.

The technologies described in the disclosed embodiments include a focal point monitoring system that identifies where a camera is positioned with respect to a display and adjusts information on the display based upon the camera location during an online meeting. In this manner, the user's eyes may focus more closely to the camera. The disclosed embodiments also include a matrix of cameras behind a display and eye tracking methods for online meeting users. Depending on where the user's eyes are focused on a screen, a particular camera of the matrix may be activated, which may make conversations more engaging. In addition, present embodiments may include using additional techniques to increase the users' focus during the online meeting. For example, notifications may be provided to prompt a user to share a window with other users and/or allow the other users see at least a contextual indicator of what the user is focusing on during the online meeting.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A focal awareness system, comprising:
   one or more processors; and memory storing instructions executable by the one or more processors to cause the one or more processors to:
  identify a position of a video window within an online meeting window on a display during an online meeting;
  identify a respective location of each camera of a matrix of cameras with respect to the position of the video window;
  determine a closest camera having a shortest distance with respect to the position of the video window based on the respective location of each camera of the matrix of cameras; and
  activate the closest camera.

2. The focal awareness system of claim 1, wherein the video window presents a video image of a user attending the online meeting.

3. The focal awareness system of claim 2, wherein the instructions are executable by the one or more processors to cause the one or more processors to:
  identify that the user is speaking; and
  in response to identifying that the user is speaking, activate the closest camera.

4. The focal awareness system of claim 3, wherein the instructions are executable by the one or more processors to cause the one or more processors to:
  identify a respective position of an additional video window within the online meeting window on the display, wherein the additional video window presents a respective video image of an additional user attending the online meeting;
  identify a respective location of each camera of the matrix of cameras with respect to the respective position of the additional video window;
  determine a respective closest camera having a respective shortest distance with respect to the respective position of the additional video window based on the respective location of each camera of the matrix of cameras;
  identify that the additional user is speaking; and
  in response to identifying that the additional user is speaking, activate the respective closest camera having the respective shortest distance with respect to the respective position of the additional video window.

5. The focal awareness system of claim 1, wherein the matrix of cameras comprises a plurality of cameras aligned with a plurality of modified pixels on the display that enable the matrix of cameras to capture images through the plurality of modified pixels on the display.

\* \* \* \* \*